US010726580B2

(12) United States Patent
Zhou et al.

(10) Patent No.: US 10,726,580 B2
(45) Date of Patent: Jul. 28, 2020

(54) METHOD AND DEVICE FOR CALIBRATION (71) Applicant: ArcSoft Corporation Limited, Hangzhou (CN)

(72) Inventors: Wen Zhou, Hangzhou (CN); Wei Zhou, Hangzhou (CN); Long Zhang, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 148 days.

(21) Appl. No.: 16/143,437

(22) Filed: Sep. 26, 2018

(65) Prior Publication Data

US 2019/0096092 A1   Mar. 28, 2019

(30) Foreign Application Priority Data

Sep. 27, 2017   (CN) .......................... 2017 1 0892866

(51) Int. Cl.
*G06T 7/80* (2017.01)
*G06T 7/33* (2017.01)
*G06T 7/37* (2017.01)
*G06T 7/73* (2017.01)

(52) U.S. Cl.
CPC ................ *G06T 7/85* (2017.01); *G06T 7/344* (2017.01); *G06T 7/37* (2017.01); *G06T 7/74* (2017.01); *G06T 7/80* (2017.01); *G06T 2207/10012* (2013.01); *G06T 2207/10028* (2013.01); *G06T 2207/30196* (2013.01); *G06T 2207/30204* (2013.01)

(58) Field of Classification Search
CPC ..... G06T 7/85; G06T 7/80; G06T 7/74; G06T 7/37; G06T 7/344; G06T 2207/30196; G06T 2207/10028; G06T 2207/10012; G06T 2207/30204
USPC ........................................................ 382/154
See application file for complete search history.

(56) References Cited

U.S. PATENT DOCUMENTS

| 2010/0165077 | A1* | 7/2010  | Yin ...................... H04N 19/597 348/42 |
| 2017/0228864 | A1* | 8/2017  | Liu ...................... H04N 13/246 |
| 2018/0131861 | A1* | 5/2018  | Schillebeeckx ...... H04N 17/002 |
| 2019/0122378 | A1* | 4/2019  | Aswin ..................... G06N 3/08 |
| 2019/0364206 | A1* | 11/2019 | Dal Mutto .......... H04N 5/23238 |
| 2019/0385360 | A1* | 12/2019 | Yang ...................... G06T 17/05 |

* cited by examiner

Primary Examiner — Jerome Grant, II
(74) Attorney, Agent, or Firm — Osha Liang LLP (57) ABSTRACT The present invention provides a method and device for calibration, applied to the field of image processing. The method comprises: obtaining a first two-dimensional image of a calibration object with a marking point and a first depth map of the calibration object, obtaining calibrated three-dimensional model data of the calibration object, determining a first three-dimensional marking point in the first depth map corresponding to the marking point based on the marking point in the first two-dimensional image, determining a second three-dimensional marking point in the three-dimensional model data of the calibration object corresponding to the marking point based on the marking point in the first two-dimensional image, and determining a first matrix. By adoption of the method mentioned above, when the device for photographing the three-dimensional image is calibrated, it is simple and feasible, and the operation difficulty is small.

22 Claims, 5 Drawing Sheets

401 — Obtaining a first portion of a three-dimensional model of a calibration object, and a second portion of the three-dimensional model of the calibration object, wherein the first portion of the three-dimensional model of the calibration object is photographed by a third photographic device, the second portion of the three-dimensional model of the calibration object is photographed by a fourth photographic device, and a first portion of the calibration object corresponding to the first portion of the three-dimensional model and a second portion of the calibration object corresponding to the second portion of the three-dimensional model overlap in a third portion of the calibration object 402 — Determining a fifth matrix, which is used for transforming one of the first portion of the three-dimensional model of the calibration object and the second portion of the three-dimensional model of the calibration object, so that the first portion of the three-dimensional model and the second portion of the three-dimensional model overlap in the three-dimensional model corresponding to the third portion of the calibration object

METHOD AND DEVICE FOR CALIBRATION

CROSS-REFERENCE TO RELATED APPLICATIONS

This application claims priority to Chinese Patent Application No. 201710892866.1, filed on Sep. 27, 2017, which is hereby incorporated by reference in its entirety.

TECHNICAL FIELD

The present invention relates to a method and device for image processing, and specifically, relates to a method and device for calibration.

BACKGROUND

At present, research on the related technology of photographing three-dimensional images has been developed for several decades. Early devices for photographing three-dimensional images mainly adopt laser, structured light, large-scale camera arrays and other specialized sensors, the reconstruction precision of three-dimensional models is high, but the prices are very high, so that the devices are only suitable for large entities, but are not suitable for small businesses or home users. In recent years, with the development of technologies, many low-cost devices for photographing three-dimensional images have emerged, for example, a depth camera capable of automatically moving is used, such a device requires the user to rotate it multiple angles according to a voice prompt for photographing, and meanwhile the depth camera automatically moves up and down to photograph depth maps of a photographed object at all angles. Finally, the depth maps photographed at the various angles are synthesized into a complete three-dimensional model of the photographed object by using an algorithm.

The three-dimensional image photographing device needs to be calibrated before use. However, the method for calibrating the three-dimensional image photographing device in the prior art is complicated and difficult to operate.

SUMMARY

A method and device for calibration provided by the present invention can effectively solve the problem that the method for calibrating a three-dimensional image photographing device in the prior art is complicated and difficult to operate.

A first aspect of the present invention provides a method for calibration, comprising: obtaining a first two-dimensional image of a calibration object with a marking point and a first depth map of the calibration object, and obtaining calibrated three-dimensional model data of the calibration object, wherein pixels in the first two-dimensional image correspond to pixels in the first depth map; determining a first three-dimensional marking point in the first depth map corresponding to the marking point based on the marking point in the first two-dimensional image, and determining a second three-dimensional marking point in the three-dimensional model data of the calibration object corresponding to the marking point based on the marking point in the first two-dimensional image; and determining a first matrix, which is used for transforming at least one of the first depth map of the calibration object and the three-dimensional model data of the calibration object, so that the first three-dimensional marking point and the second three-dimensional marking point are aligned.

According to the first aspect of the present invention, in a first executable mode of the first aspect of the present invention, determining a first matrix comprises: determining a second matrix, which is used for first transformation on at least one of the first depth map of the calibration object and the three-dimensional model data of the calibration object, so that the first three-dimensional marking point and the second three-dimensional marking point are roughly aligned; and determining a third matrix, which is used for second transformation on at least one of the first depth map of the calibration object subjected to the first transformation and the three-dimensional model data of the calibration object subjected to the first transformation, so that the first three-dimensional marking point and the second three-dimensional marking point are accurately aligned. The first matrix is calculated from the second matrix and the third matrix.

According to the first executable mode of the first aspect of the present invention, in a second executable mode of the first aspect of the present invention, determining a second matrix comprises: determining the second matrix via a random sample consensus algorithm; or determining a third matrix comprises: determining the third matrix via an iterative closest point algorithm by using the second matrix as an initial value.

According to the first aspect of the present invention, in a third executable mode of the first aspect of the present invention, determining a first matrix comprises: determining a second matrix, which is used for first transformation on at least one of the first depth map of the calibration object and the three-dimensional model data of the calibration object, so that the first three-dimensional marking point and the second three-dimensional marking point are roughly aligned; and determining the first matrix, wherein the first matrix is obtained by performing second transformation with the second matrix as an initial value, and the second transformation is performed on at least one of the first depth map of the calibration object subjected to the first transformation and the three-dimensional model data of the calibration object subjected to the first transformation, so that the first three-dimensional marking point and the second three-dimensional marking point are accurately aligned.

According to the third executable mode of the first aspect of the present invention, in a fourth executable mode of the first aspect of the present invention, determining a second matrix comprises: determining the second matrix via a random sample consensus algorithm; or determining a first matrix comprises: determining the first matrix via an iterative closest point algorithm by using the second matrix as the initial value.

According to the first aspect of the present invention or any executable mode of the first executable mode to the fourth executable mode of the first aspect of the present invention, in a fifth executable mode of the first aspect of the present invention, the marking point is a marking point having a color; determining a first three-dimensional marking point in the first depth map corresponding to the marking point based on the marking point in the first two-dimensional image comprises: determining coordinates in the first two-dimensional image representing pixels of the marking point according to the color, and determining coordinates of the first three-dimensional marking point in the first depth map corresponding to the marking point according to a corresponding relation between the pixels in the first two-dimensional image and the pixels in the first depth map; and determining a second three-dimensional marking point in the three-dimensional model data of the calibration object corresponding to the marking point based on the marking point in the first two-dimensional image comprises: determining coordinates of the second three-dimensional marking point in the three-dimensional model data of the calibration object corresponding to the marking point according to a positional relation between a first two-dimensional photographic device for photographing the first two-dimensional image and a three-dimensional calibration photographic device for photographing the three-dimensional model data of the calibration object, and the coordinates of the pixels of the marking point in the first two-dimensional image.

According to the first aspect of the present invention or any executable mode of the first executable mode of the first aspect of the present invention to the fifth executable mode of the first aspect of the present invention, in a sixth executable mode of the first aspect of the present invention, the method further comprises: obtaining a second two-dimensional image of the calibration object and a second depth map of the calibration object, wherein pixels in the second two-dimensional image correspond to pixels in the second depth map, and a second photographic device for photographing the second two-dimensional image and the second depth map is different from the first photographic device for photographing the first two-dimensional image and the first depth map; determining a third three-dimensional marking point in the second depth map corresponding to the marking point based on the marking point in the second two-dimensional image, and determining a fourth three-dimensional marking point in the three-dimensional model data of the calibration object corresponding to the marking point based on the marking point in the second two-dimensional image; determining a fourth matrix, which is used for transforming at least one of the second depth map of the calibration object and the three-dimensional model data of the calibration object, so that the third three-dimensional marking point and the fourth three-dimensional marking point are aligned; and determining a fifth matrix according to the first matrix and the fourth matrix, wherein the fifth matrix is used for representing a positional relation between the first photographic device and the second photographic device.

A second aspect of the present invention provides a method for calibration, comprising: obtaining a first portion of a three-dimensional model of a calibration object, and a second portion of the three-dimensional model of the calibration object, wherein the first portion of the three-dimensional model of the calibration object is photographed by a third photographic device, the second portion of the three-dimensional model of the calibration object is photographed by a fourth photographic device, and a first portion of the calibration object corresponding to the first portion of the three-dimensional model and a second portion of the calibration object corresponding to the second portion of the three-dimensional model are overlapped on a third portion of the calibration object; and determining a fifth matrix, which is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object.

According to the second aspect of the present invention, in a first executable mode of the second aspect of the present invention, determining a fifth matrix comprises: determining the fifth matrix via an iteration nearest point algorithm.

According to the second aspect of the present invention or the first executable mode of the second aspect of the present invention, in a second executable mode of the second aspect of the present invention, the calibration object is a human body model, the first portion of the three-dimensional model of the calibration object is a three-dimensional model of an upper segment of the human body model, and the second portion of the three-dimensional model of the calibration object is a three-dimensional model of a middle segment of the human body model; and that the fifth matrix is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object comprises: the fifth matrix is used for transforming the three-dimensional model of the middle segment of the human body model, so that the three-dimensional model of the middle segment of the human body model and the three-dimensional model of the upper segment of the human body model are overlapped on the three-dimensional model corresponding to the third portion of the calibration object.

A third aspect of the present invention provides a device for calibration, comprising: a first obtaining module, configured to obtain a first two-dimensional image of a calibration object with a marking point and a first depth map of the calibration object, and obtain calibrated three-dimensional model data of the calibration object, wherein pixels in the first two-dimensional image correspond to pixels in the first depth map; a first determining module, configured to determine a first three-dimensional marking point in the first depth map corresponding to the marking point based on the marking point in the first two-dimensional image, and determine a second three-dimensional marking point in the three-dimensional model data of the calibration object corresponding to the marking point based on the marking point in the first two-dimensional image; and a second determining module, configured to determine a first matrix, which is used for transforming at least one of the first depth map of the calibration object and the three-dimensional model data of the calibration object, so that the first three-dimensional marking point and the second three-dimensional marking point are aligned.

According to the third aspect of the present invention, in a first executable mode of the third aspect of the present invention, the second determining module is specifically configured to: determine a second matrix, which is used for first transformation on at least one of the first depth map of the calibration object and the three-dimensional model data of the calibration object, so that the first three-dimensional marking point and the second three-dimensional marking point are roughly aligned; and determine a third matrix, which is used for second transformation on at least one of the first depth map of the calibration object subjected to the first transformation and the three-dimensional model data of the calibration object subjected to the first transformation, so that the first three-dimensional marking point and the second three-dimensional marking point are accurately aligned; and the first matrix is calculated from the second matrix and the third matrix.

According to the first executable mode of the third aspect of the present invention, in a second executable mode of the third aspect of the present invention, the second determining module is specifically configured to: determine the second matrix via a random sample consensus algorithm; or determine the third matrix via an iterative closest point algorithm by using the second matrix as an initial value.

According to the third aspect of the present invention, in a third executable mode of the third aspect of the present invention, the second determining module is specifically configured to: determine a second matrix, which is used for first transformation on at least one of the first depth map of the calibration object and the three-dimensional model data of the calibration object, so that the first three-dimensional marking point and the second three-dimensional marking point are roughly aligned; and determine the first matrix, wherein the first matrix is obtained by performing second transformation with the second matrix as an initial value, and the second transformation is performed on at least one of the first depth map of the calibration object subjected to the first transformation and the three-dimensional model data of the calibration object subjected to the first transformation, so that the first three-dimensional marking point and the second three-dimensional marking point are accurately aligned.

According to the third executable mode of the third aspect of the present invention, in a fourth executable mode of the third aspect of the present invention, the second determining module is specifically configured to: determine the second matrix via a random sample consensus algorithm; or determine the first matrix via an iterative closest point algorithm by using the second matrix as the initial value.

According to the third aspect of the present invention or any executable mode of the first executable mode of the third aspect of the present invention to the fourth executable mode of the third aspect of the present invention, in a fifth executable mode of the third aspect of the present invention, the marking point is a marking point having a color; the first determining module is configured to: determine coordinates in the first two-dimensional image representing pixels of the marking point according to the color, and determine coordinates of the first three-dimensional marking point in the first depth map corresponding to the marking point according to a corresponding relation between the pixels in the first two-dimensional image and the pixels in the first depth map; and determine coordinates of the second three-dimensional marking point in the three-dimensional model data of the calibration object corresponding to the marking point according to a positional relation between a first two-dimensional photographic device for photographing the first two-dimensional image and a three-dimensional calibration photographic device for photographing the three-dimensional model data of the calibration object, and the coordinates of the pixels of the marking point in the first two-dimensional image.

According to the third aspect of the present invention or any executable mode of the first executable mode of the third aspect of the present invention to the fifth executable mode of the third aspect of the present invention, in a sixth executable mode of the third aspect of the present invention, the device further comprises: a second obtaining module, configured to obtain a second two-dimensional image of the calibration object and a second depth map of the calibration object, wherein pixels in the second two-dimensional image correspond to pixels in the second depth map, and a second photographic device for photographing the second two-dimensional image and the second depth map is different from the first photographic device for photographing the first two-dimensional image and the first depth map; and a third determining module, configured to determine a third three-dimensional marking point in the second depth map corresponding to the marking point based on the marking point in the second two-dimensional image, and determine a fourth three-dimensional marking point in the three-dimensional model data of the calibration object corresponding to the marking point based on the marking point in the second two-dimensional image; determine a fourth matrix, which is used for transforming at least one of the second depth map of the calibration object and the three-dimensional model data of the calibration object, so that the third three-dimensional marking point and the fourth three-dimensional marking point are aligned; and determine a fifth matrix according to the first matrix and the fourth matrix, wherein the fifth matrix is used for representing a positional relation between the first photographic device and the second photographic device.

A fourth aspect of the present invention provides a device for calibration, comprising: a third obtaining module, configured to obtain a first portion of a three-dimensional model of a calibration object, and a second portion of the three-dimensional model of the calibration object, wherein the first portion of the three-dimensional model of the calibration object is photographed by a third photographic device, the second portion of the three-dimensional model of the calibration object is photographed by a fourth photographic device, and a first portion of the calibration object corresponding to the first portion of the three-dimensional model and a second portion of the calibration object corresponding to the second portion of the three-dimensional model are overlapped on a third portion of the calibration object; and a fourth determining module, configured to determine a fifth matrix, which is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object.

According to the fourth aspect of the present invention, in a first executable mode of the fourth aspect of the present invention, the fourth determining module is specifically configured to: determine the fifth matrix via an iteration nearest point algorithm.

According to the fourth aspect of the present invention or the first executable mode of the fourth aspect of the present invention, in a second executable mode of the fourth aspect of the present invention, the calibration object is a human body model, the first portion of the three-dimensional model of the calibration object is a three-dimensional model of an upper segment of the human body model, and the second portion of the three-dimensional model of the calibration object is a three-dimensional model of a middle segment of the human body model; and that the fifth matrix is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object comprises: the fifth matrix is used for transforming the three-dimensional model of the middle segment of the human body model, so that the three-dimensional model of the middle segment of the human body model and the three-dimensional model of the upper segment of the human body model are overlapped on the three-dimensional model corresponding to the third portion of the calibration object.

A fifth aspect of the present invention provides a computer readable storage medium, which stores a computer program, wherein the computer program, when executed by a first processor, implements the steps of the method in the first aspect of the present invention, any executable mode of the first executable mode of the first aspect of the present invention to the sixth executable mode of the first aspect of the present invention, the second aspect of the present invention, the first executable mode of the second aspect of the present invention or the second executable mode of the second aspect of the present invention.

A sixth aspect of the present invention provides a device for calibration, comprising: a memory, a second processor and a computer program which is stored in the memory and can be run on the second processor, wherein the computer program, when executed by the second processor, implements the steps of the method in the first aspect of the present invention, any executable mode of the first executable mode of the first aspect of the present invention to the sixth executable mode of the first aspect of the present invention, the second aspect of the present invention, the first executable mode of the second aspect of the present invention or the second executable mode of the second aspect of the present invention.

By adoption of the method and device for calibration provided by the present invention, when the device for photographing the three-dimensional image is calibrated, it is simple and feasible, and the operation difficulty is small.

DESCRIPTION OF EMBODIMENTS

The technical solutions in the embodiments of the present invention will be described in detail below in combination with the accompanying drawings in the embodiments of the present invention.

The terms "first", "second" and the like in the specification, claims and drawings of the present invention are used for distinguishing different objects, rather than limiting specific sequences.

The term "and/or" in the embodiments of the present invention is merely a correlation for describing correlated objects, and indicates three possible relations, e.g., A and/or B may indicate three situations: only A exists, both A and B exist, and only B exists.

In the embodiments of the present invention, the words such as "exemplary" or "for example" are used for indicating an example or an illustrative example or illustration. Any embodiment or design scheme described as "exemplary" or "for example" in the embodiments of the present invention should not be interpreted as being more preferable or more advantageous than other embodiments or design schemes. Exactly, the words such as "exemplary" or "for example" are used for presenting relevant concepts in specific manners.

It should be noted that, for the sake of brevity and clearness of the drawings, the components shown in the drawings do not need to be drawn to scale. For example, for the sake of clearness, the sizes of some components can be increased relative to other components. In addition, reference signs can be repeated, where appropriate, among the drawings to indicate corresponding or similar components in view of this.

Figure 1:
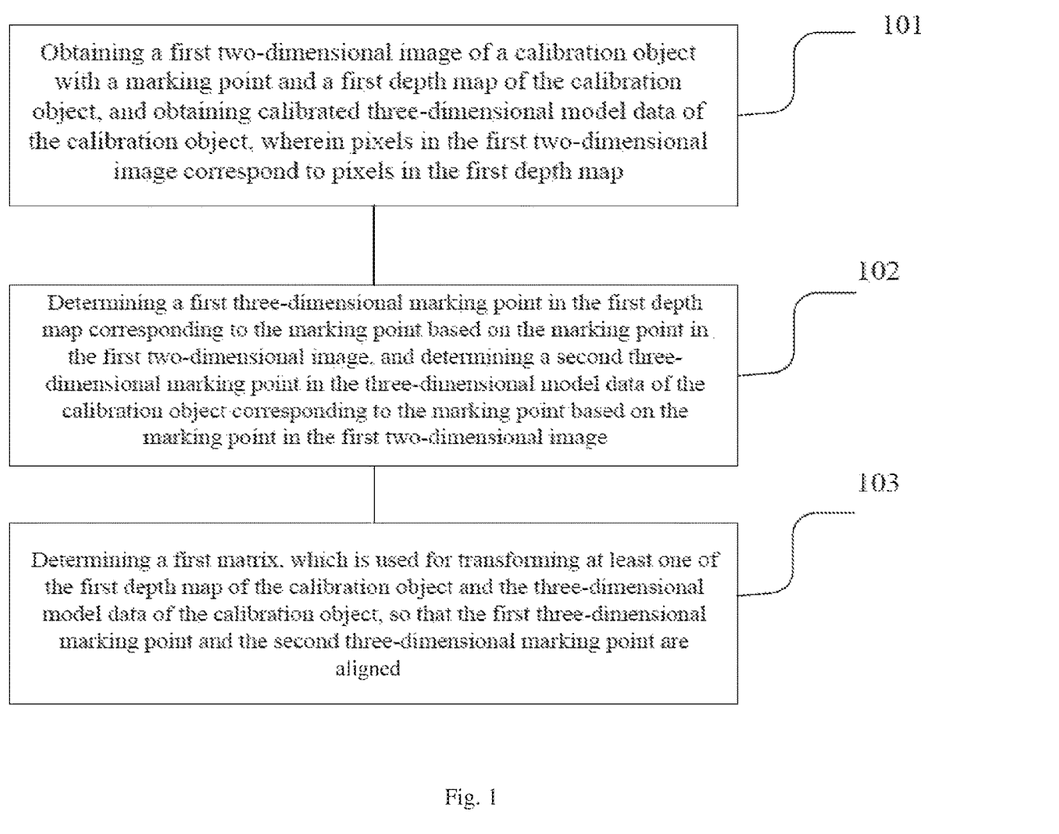
FIG. 1 is a flow diagram of a method for calibration provided by embodiment 1 of the present invention.

A method for calibration provided by embodiment 1 of the present invention is illustrated below in detail in combination with FIG. 1. As shown in FIG. 1, the method comprises:

Step 101, obtaining a first two-dimensional image of a calibration object with a marking point and a first depth map of the calibration object, and obtaining calibrated three-dimensional model data of the calibration object, wherein pixels in the first two-dimensional image correspond to pixels in the first depth map.

Optionally, the first two-dimensional image and the first depth map may be obtained from a storage device, which may be an RAM (Random Access Memory), a flash memory or the like. Optionally, the device for photographing the first two-dimensional image may be a colored photographic device, such as an RGB camera, and the device for photographing the first depth map may be a depth photographic device, and the colored photographic device and the depth photographic device may form a photographic device group.

Optionally, the marking point is a marking point having a color, for example, may be red. The marking point may also be a marking point with a certain shape or texture. Preferably, at least two marking points are provided.

Optionally, the calibration object may be a human body model and may also be other model.

Optionally, the above-mentioned three-dimensional model data may be an incomplete three-dimensional model, that is to say, a part of three-dimensional data may also be used for performing the above-mentioned calibration work.

Optionally, the photographic scene corresponding to at least one pixel in the first two-dimensional image corresponds to the photographic scene corresponding to the pixels in the first depth map, and the coordinates of at least one pixel in the first two-dimensional image may be mapped to the coordinates of the pixels in the first depth map. Preferably, the coordinates of the pixels in the first two-dimensional image are in one-to-one correspondence with the coordinates of the pixels in the first depth map.

Step 102, determining a first three-dimensional marking point in the first depth map corresponding to the marking point based on the marking point in the first two-dimensional image, and determining a second three-dimensional marking point in the three-dimensional model data of the calibration object corresponding to the marking point based on the marking point in the first two-dimensional image.

Optionally, the marking point is a marking point having a color, and determining a first three-dimensional marking point in the first depth map corresponding to the marking point based on the marking point in the first two-dimensional image comprises: determining coordinates in the first two-dimensional image representing pixels of the marking point according to the color, and determining coordinates of the first three-dimensional marking point in the first depth map corresponding to the marking point according to a corresponding relation between the pixels in the first two-dimensional image and the pixels in the first depth map. Determining a second three-dimensional marking point in the three-dimensional model data of the calibration object corresponding to the marking point based on the marking point in the first two-dimensional image comprises: determining coordinates of the second three-dimensional marking point in the three-dimensional model data of the calibration object corresponding to the marking point according to a positional relation between a first two-dimensional photographic device for photographing the first two-dimensional image and a three-dimensional calibration photographic device for photographing the three-dimensional model data of the calibration object, and the coordinates of the pixels of the marking point in the first two-dimensional image. Specifically, the first two-dimensional image may be an RGB image, the color of the calibration object may be white, the color of the marking point may be red, and the coordinates of the marking point in the first two-dimensional image may be determined by searching for the red pixels on the calibration object in the first two-dimensional image. As the positional relation between the first two-dimensional photographic device and the three-dimensional calibration photographic device and the transformation relation of coordinate systems thereof or mapping relation may be represented by internal parameters and/or external parameters of the photographic devices, the second three-dimensional marking point, corresponding to the marking point in the first two-dimensional image, in the three-dimensional model data of the calibration object photographed by the three-dimensional calibration photographic device may be obtained.

Optionally, the three-dimensional model data of the calibration object are obtained by the three-dimensional calibration photographic device by photographing the calibration object prior to calibration, and the space relation among the three-dimensional calibration photographic device, the first two-dimensional photographic device and the depth photographic device for photographing the first depth map is known, and then the transformation relation among their coordinate systems is known and may be represented by a matrix.

Optionally, the above method helps to identify the marking point via the color of the marking point and may also identify the marking point via the shape of the marking point or the texture of the marking point, for example, the marking point is set as a triangle, the coordinates of the marking point are determined by searching for the triangle on the first two-dimensional image, the marking point may also have a special texture, and the coordinates of the marking point are determined by searching for the texture on the first two-dimensional image.

Step 103, determining a first matrix, which is used for transforming at least one of the first depth map of the calibration object and the three-dimensional model data of the calibration object, so that the first three-dimensional marking point and the second three-dimensional marking point are aligned.

Optionally, determining a first matrix comprises: determining a second matrix, which is used for first transformation on at least one of the first depth map of the calibration object and the three-dimensional model data of the calibration object, so that the first three-dimensional marking point and the second three-dimensional marking point are roughly aligned; and determining a third matrix, which is used for second transformation on at least one of the first depth map of the calibration object subjected to the first transformation and the three-dimensional model data of the calibration object subjected to the first transformation, so that the first three-dimensional marking point and the second three-dimensional marking point are accurately aligned; and the first matrix is calculated from the second matrix and the third matrix. Optionally, the above-mentioned rough alignment may be that the first three-dimensional marking point and the second three-dimensional marking point are overlapped or approximately overlapped within a relatively large error range, and the above-mentioned accurate alignment may be that the first three-dimensional marking point and the second three-dimensional marking point are overlapped or approximately overlapped within a relatively small error range. Optionally, the first matrix may also be calculated from at least two matrixes obtained by performing more than two alignments with different accuracies. Optionally, the above-mentioned rough alignment may be that the first transformation is performed on the first depth map to be aligned to the three-dimensional model data, may also be that the first transformation is performed on the three-dimensional model data to be aligned to the first depth map, may also be that the above-mentioned first transformation is performed on both of the first depth map and the three-dimensional model data to approximate to the opposite parties for alignment, and the first transformation to approximate to the opposite parties comprises sub-transformation of the two parties. Optionally, the above-mentioned accurate alignment may be that the first depth map of the calibration object subjected to the first transformation is aligned to the three-dimensional model data of the calibration object subjected to the first transformation, may also be that the three-dimensional model data of the calibration object subjected to the first transformation is aligned to the first depth map of the calibration object subjected to the first transformation, and may also be that the above-mentioned second transformation is performed on both of the first depth map of the calibration object subjected to the first transformation and the three-dimensional model data of the calibration object subjected to the first transformation to approximate to the opposite parties for alignment, and the second transformation to approximate to the opposite parties comprises sub-transformation of the two parties.

The first depth map of the calibration object subjected to the first transformation and the three-dimensional model data of the calibration object subjected to the first transformation, as described above, comprise the first depth map and the three-dimensional model data after the operations of performing the first transformation on the first depth map to be aligned to the three-dimensional model data, or performing the first transformation on the three-dimensional model data to be aligned to the first depth map, or performing the above-mentioned first transformation on both of the first depth map and the three-dimensional model data to approximate to the opposite parties, regardless of the approximating direction.

Optionally, determining a second matrix comprises: determining the second matrix via a random sample consensus (RANSAC) algorithm. Optionally, determining a third matrix comprises: determining the third matrix via an iterative closest point (ICP) algorithm by using the second matrix as an initial value.

Optionally, determining a first matrix comprises: determining a second matrix, which is used for first transformation on at least one of the first depth map of the calibration object and the three-dimensional model data of the calibration object, so that the first three-dimensional marking point and the second three-dimensional marking point are roughly aligned; and determining the first matrix, wherein the first matrix is obtained by performing second transformation with the second matrix as an initial value, and the second transformation is performed on at least one of the first depth map of the calibration object subjected to the first transformation and the three-dimensional model data of the calibration object subjected to the first transformation, so that the first three-dimensional marking point and the second three-dimensional marking point are accurately aligned. Optionally, the above-mentioned rough alignment may be that the first transformation is performed on the first depth map to be aligned to the three-dimensional model data, may also be that the first transformation is performed on the three-dimensional model data to be aligned to the first depth map, may also be that the above-mentioned first transformation is performed on both of the first depth map and the three-dimensional model data to approximate to the opposite parties for alignment, and the first transformation to approximate to the opposite parties comprises sub-transformation of the two parties. Optionally, the above-mentioned accurate alignment may be that the second transformation is performed on the first depth map of the calibration object subjected to the first transformation to be aligned to the three-dimensional model data of the calibration object subjected to the first transformation, may also be that the second transformation is performed on the three-dimensional model data of the calibration object subjected to the first transformation to be aligned to the first depth map of the calibration object subjected to the first transformation, and may also be that the above-mentioned first transformation is performed on both of the first depth map of the calibration object subjected to the first transformation and the three-dimensional model data of the calibration object subjected to the first transformation to approximate to the opposite parties for alignment, and the first transformation to approximate to the opposite parties comprises sub-transformation of the two parties.

Optionally, determining a second matrix comprises: determining the second matrix via a random sample consensus algorithm. Optionally, determining a first matrix comprises: determining the first matrix via the iterative closest point algorithm by using the second matrix as the initial value.

Optionally, the method further comprises: obtaining a second two-dimensional image of the calibration object and a second depth map of the calibration object, wherein pixels in the second two-dimensional image correspond to pixels in the second depth map, and a second photographic device for photographing the second two-dimensional image and the second depth map is different from the first photographic device for photographing the first two-dimensional image and the first depth map; determining a third three-dimensional marking point in the second depth map corresponding to the marking point based on the marking point in the second two-dimensional image, and determining a fourth three-dimensional marking point in the three-dimensional model data of the calibration object corresponding to the marking point based on the marking point in the second two-dimensional image; determining a fourth matrix, which is used for transforming at least one of the second depth map of the calibration object and the three-dimensional model data of the calibration object, so that the third three-dimensional marking point and the fourth three-dimensional marking point are aligned; and determining a fifth matrix according to the first matrix and the fourth matrix, wherein the fifth matrix is used for representing a positional relation between the first photographic device and the second photographic device. The above-mentioned first photographic device and second photographic device are photographic device groups comprising ordinary photographic devices and depth photographic devices.

Optionally, the method further comprises: obtaining a second two-dimensional image of the calibration object and a second depth map of the calibration object, wherein pixels in the second two-dimensional image correspond to pixels in the second depth map, and a second photographic device for photographing the second two-dimensional image and the second depth map is different from the first photographic device for photographing the first two-dimensional image and the first depth map; determining a third three-dimensional marking point in the second depth map corresponding to the marking point based on the marking point in the second two-dimensional image, and determining a fourth three-dimensional marking point in the three-dimensional model data of the calibration object corresponding to the marking point based on the marking point in the second two-dimensional image; determining a fourth matrix, which is used for transforming at least one of the second depth map of the calibration object and the three-dimensional model data of the calibration object, so that the third three-dimensional marking point and the fourth three-dimensional marking point are aligned; and determining a fifth matrix according to the first matrix and the fourth matrix, wherein the fifth matrix is used for representing a positional relation between the first photographic device and the second photographic device. Optionally, the first photographic device is a photographic device group composed of a photographic device for photographing the first two-dimensional image and a photographic device for photographing the first depth map, and the second photographic device is a photographic device group composed of a photographic device for photographing the second two-dimensional image and a photographic device for photographing the second depth map. The positional relation between the first photographic device and the second photographic device may be obtained according to the first matrix and the fourth matrix, and the relation among the coordinate system of the first photographic device, the coordinate system of the second photographic device and the coordinate system of the three-dimensional calibration photographic device may also be known. For other detailed description about this paragraph, reference can be made to relevant introduction above.

Figure 2:
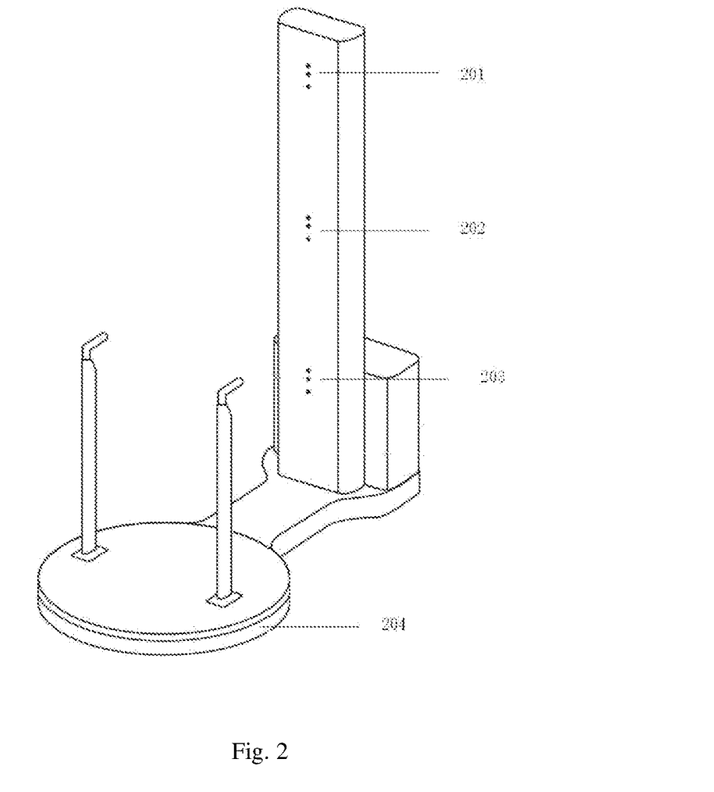
FIG. 2 is a schematic diagram of a device for calibration provided by embodiment 1 of the present invention.
Figure 3:
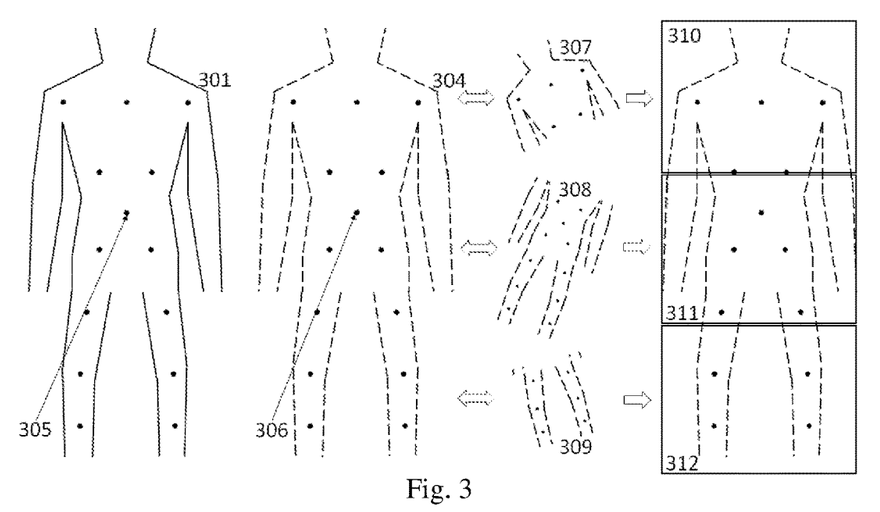
FIG. 3 is a schematic diagram of another method for calibration provided by embodiment 1 of the present invention.

Specifically, as shown in FIG. 2, 201 represents the above-mentioned first photographic device, 202 represents the second photographic device, 203 represents the third photographic device, 204 represents a turntable for placing the above-mentioned calibration object, the three-dimensional calibration photographic device is not shown in FIG. 2, and the three-dimensional calibration photographic device comprises a two-dimensional calibration photographic device for photographing two-dimensional images and a depth calibration photographic device for photographing depth images. The calibration method described above may be used for calibrating the three photographic devices 201, 202 and 203 described above, and may also be used for calibrating two of the photographic devices. As shown in FIG. 3, 301 represents the calibration object, and 305 represents the marking point on the calibration object. After marking point 305 is photographed by the two-dimensional calibration photographic device 302, the marking point may be mapped into three-dimensional model data 304 to become a three-dimensional marking point 306 by means of the positional relation between the two-dimensional calibration photographic device 302 and the depth calibration photographic device 303 and internal parameters of the photographic devices. After a set of these three-dimensional marking points 306 and the three-dimensional model data 304 are obtained, the photographic devices 201, 202 and 203 are used for photographing the calibration object 301 to obtain three segments of uncalibrated depth maps or point clouds 307, 308 and 309 collected by the photographic devices 201, 202 and 203, and then the 307, 308 and 309 are respectively aligned with the 304 to obtain transformation matrixes of the photographic devices 201, 202 and 203, so that the three segments of uncalibrated depth maps or point clouds 307, 308 and 309 are mapped to correct positions 310, 311 and 312, and an effect of reconstructing a model 301 is achieved.

As the positional relation between the two-dimensional calibration photographic device 302 and the depth calibration photographic device 303 and the respective internal parameters thereof can be obtained in advance, the points in each frame of two-dimensional image photographed by 302 may be mapped into the depth image photographed by the corresponding 303. Therefore, a visible two-dimensional marking point set 305 detected on the two-dimensional image may be mapped to the three-dimensional model data 304 by means of this single frame alignment type coordinate mapping method to form a set of the three-dimensional marking points 306. By means of the same method, the rough alignment based on RANSAC (Random Sample Consensus) is performed on corresponding three-dimensional marking points found in a first depth image collected by the photographic device 201 and the three-dimensional marking points 306 on the three-dimensional model data 304 to obtain the second matrix. Then, with the second matrix as an initial value, the accurate alignment is performed by using the iterative closest point algorithm to achieve the accurate alignment of three model segments 307 and the segment 310 in the three-dimensional model data 304. During the calibration, the above-mentioned calibration is respectively performed on the three photographic devices 201, 202 and 203 described above, so that not only is the spatial positional relation between every two photographic devices of the three photographic devices 201, 202 and 203 obtained, but also the coordinate systems of these photographic devices are mapped into the coordinate system of the three-dimensional model data 304 via the alignment.

By adoption of the method for calibration provided by the present invention as described above, when the device for photographing the three-dimensional image is calibrated, it is simple and feasible, and the operation difficulty is small. As a plurality of cameras are used for scanning, the three-dimensional imaging effect of the head and the bottom is better than that if a moving camera is used for scanning, the calibration is easier, and smaller space is occupied than that if the three-dimensional photographing and calibration method of using a plurality of cameras surrounding the photographed object.

Figure 4:
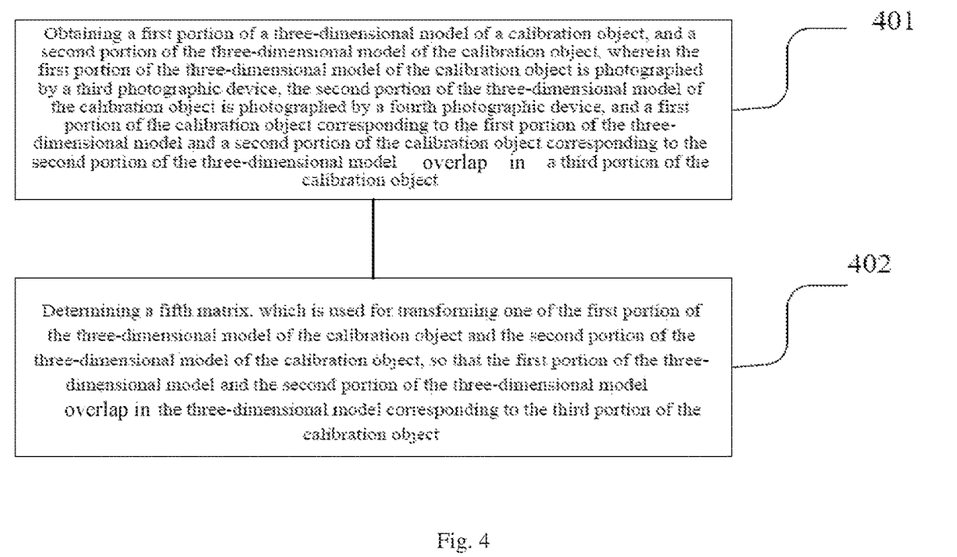
FIG. 4 is a flow diagram of a method for calibration provided by embodiment 2 of the present invention.

A method for calibration provided by embodiment 2 of the present invention is illustrated below in detail in combination with FIG. 4. As shown in FIG. 4, the method comprises:

Step 401, obtaining a first portion of a three-dimensional model of a calibration object, and a second portion of the three-dimensional model of the calibration object, wherein the first portion of the three-dimensional model of the calibration object is photographed by a third photographic device, the second portion of the three-dimensional model of the calibration object is photographed by a fourth photographic device, and a first portion of the calibration object corresponding to the first portion of the three-dimensional model and a second portion of the calibration object corresponding to the second portion of the three-dimensional model are overlapped on a third portion of the calibration object; and optionally, the first portion of the three-dimensional model may be a three-dimensional model of an upper half portion of the calibration object, and the second portion of the three-dimensional model may be a three-dimensional model of a middle portion of the calibration object, the three-dimensional model of the upper half portion and the three-dimensional model of the middle portion are partially overlapped, that is to say, the first portion of the calibration object corresponding to the three-dimensional model of the upper half portion and the second portion of the calibration object corresponding to the second portion of the three-dimensional model are overlapped on the third portion of the calibration object.

Step 402, determining a fifth matrix, which is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object.

Optionally, the first portion of the three-dimensional model of the calibration object may be transformed to be aligned to the second portion of the three-dimensional model of the calibration object, and the second portion of the three-dimensional model of the calibration object may also be transformed to be aligned to the first portion of the three-dimensional model of the calibration object.

Optionally, the fifth matrix is determined by the iterative closest point algorithm.

Optionally, the calibration object is a human body model, the first portion of the three-dimensional model of the calibration object is a three-dimensional model of an upper segment of the human body model, and the second portion of the three-dimensional model of the calibration object is a three-dimensional model of a middle segment of the human body model; and that the fifth matrix is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object includes: the fifth matrix is used for transforming the three-dimensional model of the middle segment of the human body model, so that the three-dimensional model of the middle segment of the human body model and the three-dimensional model of the upper segment of the human body model are overlapped on the three-dimensional model corresponding to the third portion of the calibration object.

Figure 5:
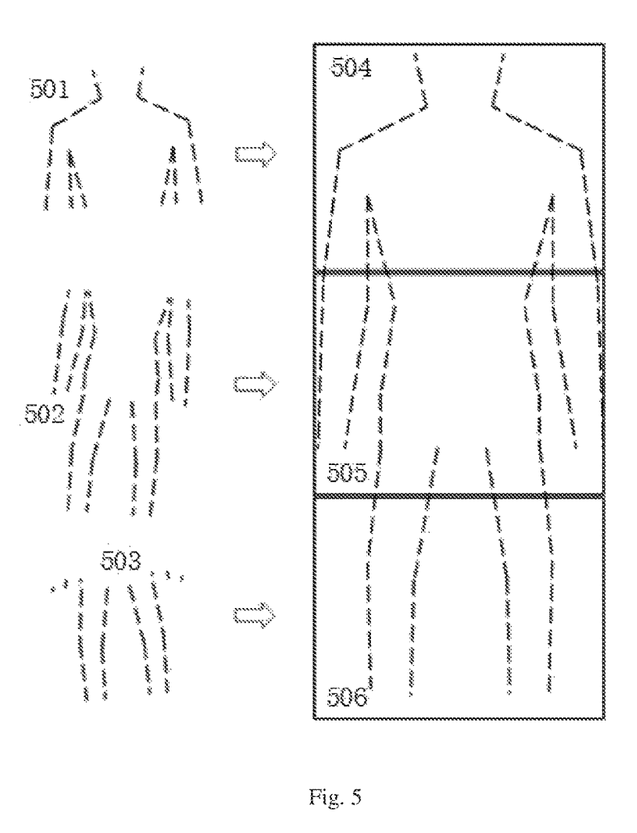
FIG. 5 is a schematic diagram of a method for calibration provided by embodiment 2 of the present invention.

Exemplarily, as shown in FIG. 5, the three segments of three-dimensional models of the calibration object are used as an example for description. The first portion of the three-dimensional model of the calibration object, the second portion of the three-dimensional model and the third portion of the three-dimensional model may be obtained from a memory, and the memory may be an RAM, an ROM or a flash. 501 represents the first portion of the three-dimensional model of the calibration object, 502 represents the second portion of the three-dimensional model of the calibration object, 503 represents the third portion of the three-dimensional model of the calibration object, and the first portion and the second portion of the three-dimensional model described above may be read from the above-mentioned memory, the above-mentioned 501 and/or 502 may be a three-dimensional model after a depth map and depth maps obtained by rotating the calibration object some angles are fused, or a three-dimensional model after depth maps of different angles obtained by rotating the calibration object 360 degrees are fused. In FIG. 5, the 502 is transformed and is aligned to the 501 via ICP to obtain 505, the 505 is partially overlapped with 504 (i.e., 501), and the corresponding transformation matrix is obtained. Similarly, after the 502 and the 501 are aligned, the 503 is aligned to the 502 to obtain 506, the 506 is partially overlapped with the 505, and the corresponding transformation matrix is obtained. Optionally, the 501 may also be transformed and is aligned to the 502 via the ICP, and the 5036 is aligned to the 502 via the ICP.

Compared with the calibration mode requiring the human body model in the prior art, the calibration method provided by the embodiment does not depend on the calibration object, thereby simplifying the calibration flow and the calibration method and reducing the calibration complexity.

Figure 6:
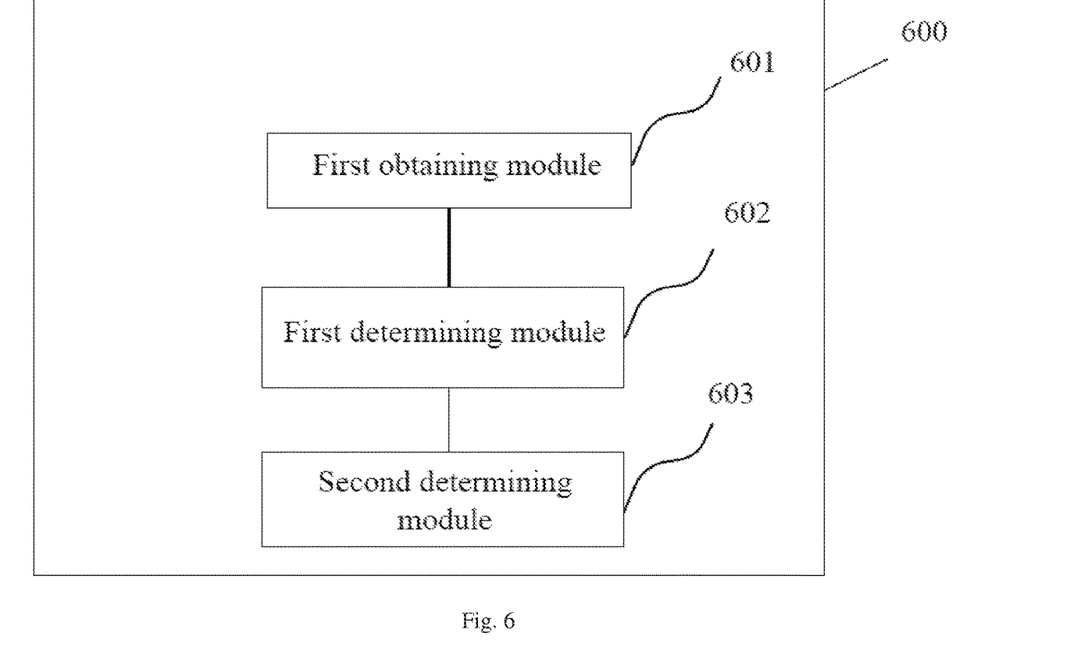
FIG. 6 is a structural schematic diagram of a device for calibration provided by embodiment 3 of the present invention.

A device for calibration provided by embodiment 3 of the present invention is illustrated below in detail in combination with FIG. 6. As shown in FIG. 6, the device 600 comprises: a first obtaining module 601, a first determining module 602 and a second determining module 603.

The first obtaining module 601 configured to obtain a first two-dimensional image of a calibration object with a marking point and a first depth map of the calibration object, and obtain calibrated three-dimensional model data of the calibration object, wherein pixels in the first two-dimensional image correspond to pixels in the first depth map.

Optionally, the first two-dimensional image and the first depth map described above may be obtained from a storage device, which may be an RAM (Random Access Memory), a flash memory or the like. Optionally, the device for photographing the first two-dimensional image may be a colored photographic device, such as an RGB camera, and the device for photographing the first depth map may be a depth photographic device, and the colored photographic device and the depth photographic device may form a photographic device group.

Optionally, the marking point is a marking point having a color, for example, may be red. The marking point may also be a marking point with a certain shape or texture. Preferably, at least two marking points are provided.

Optionally, the calibration object may be a human body model and may also be other model.

Optionally, the above-mentioned three-dimensional model data may be an incomplete three-dimensional model, that is to say, a part of three-dimensional data may also be used for performing the above-mentioned calibration work.

Optionally, the photographic scene corresponding to at least one pixel in the first two-dimensional image described above corresponds to the photographic scene corresponding to the pixels in the first depth map described above, and the coordinates of at least one pixel in the first two-dimensional image described above may be mapped to the coordinates of the pixels in the first depth map. Preferably, the coordinates of the pixels in the first two-dimensional image are in one-to-one correspondence with the coordinates of the pixels in the first depth map.

The first determining module 602 is configured to determine a first three-dimensional marking point in the first depth map corresponding to the marking point based on the marking point in the first two-dimensional image, and determine a second three-dimensional marking point in the three-dimensional model data of the calibration object corresponding to the marking point based on the marking point in the first two-dimensional image.

Optionally, the marking point is a marking point having a color, and the first determining module is specifically configured to:

determine coordinates in the first two-dimensional image representing pixels of the marking point according to the color, and determine coordinates of the first three-dimensional marking point in the first depth map corresponding to the marking point according to a corresponding relation between the pixels in the first two-dimensional image and the pixels in the first depth map; and determine coordinates of the second three-dimensional marking point in the three-dimensional model data of the calibration object corresponding to the marking point according to a positional relation between a first two-dimensional photographic device for photographing the first two-dimensional image and a three-dimensional calibration photographic device for photographing the three-dimensional model data of the calibration object, and the coordinates of the pixels of the marking point in the first two-dimensional image. Specifically, the first two-dimensional image may be an RGB image, the color of the calibration object may be white, the color of the marking point may be red, and the coordinates of the marking point in the first two-dimensional image may be determined by searching for the red pixels on the calibration object in the above-mentioned first two-dimensional image. As the positional relation between the first two-dimensional photographic device and the three-dimensional calibration photographic device and the transformation relation of coordinate systems thereof or the mapping relation may be represented by internal parameters and/or external parameters of the photographic devices, the second three-dimensional marking point, corresponding to the marking point in the above-mentioned first two-dimensional image, in the three-dimensional model data of the above-mentioned calibration object photographed by the three-dimensional calibration photographic device may be obtained.

Optionally, the three-dimensional model data of the calibration object are obtained by the three-dimensional calibration photographic device by photographing the calibration object prior to calibration, and the space relation among the three-dimensional calibration photographic device, the first two-dimensional photographic device and a depth photographic device for photographing the first depth map is known, and then the transformation relation among their coordinate systems is known and may be represented by a matrix.

Optionally, the above method helps to identify the marking point via the color of the marking point and may also identify the marking point via the shape of the marking point or the texture of the marking point, for example, the marking point is set as a triangle, the coordinates of the marking point are determined by searching for the triangle on the first two-dimensional image, the marking point may also have a special texture, and the coordinates of the marking point are determined by searching for the texture on the first two-dimensional image.

The second determining module 603 is configured to determine a first matrix, which is used for transforming at least one of the first depth map of the calibration object and the three-dimensional model data of the calibration object, so that the first three-dimensional marking point and the second three-dimensional marking point are aligned.

Optionally, the second determining module is specifically configured to: determine a second matrix, which is used for first transformation on at least one of the first depth map of the calibration object and the three-dimensional model data of the calibration object, so that the first three-dimensional marking point and the second three-dimensional marking point are roughly aligned; and determine a third matrix, which is used for second transformation on at least one of the first depth map of the calibration object subjected to the first transformation and the three-dimensional model data of the calibration object subjected to the first transformation, so that the first three-dimensional marking point and the second three-dimensional marking point are accurately aligned; and the first matrix is calculated from the second matrix and the third matrix.

Optionally, the above-mentioned rough alignment may be that the first three-dimensional marking point and the second three-dimensional marking point are overlapped or approximately overlapped within a relatively large error range, and the above-mentioned accurate alignment may be that the first three-dimensional marking point and the second three-dimensional marking point are overlapped or approximately overlapped within a relatively small error range. Optionally, the first matrix may also be calculated from at least two matrixes obtained by performing more than two alignments with different accuracies. Optionally, the above-mentioned rough alignment may be that the first transformation is performed on the first depth map to be aligned to the three-dimensional model data, may also be that the first transformation is performed on the three-dimensional model data to be aligned to the first depth map, may also be that the above-mentioned first transformation is performed on both of the first depth map and the three-dimensional model data to approximate to the opposite parties for alignment, and the first transformation to approximate to the opposite parties comprises sub-transformation of the two parties. Optionally, the above-mentioned accurate alignment may be that the first depth map of the calibration object subjected to the first transformation is aligned to the three-dimensional model data of the calibration object subjected to the first transformation, may also be that the three-dimensional model data of the calibration object subjected to the first transformation is aligned to the first depth map of the calibration object subjected to the first transformation, and may also be that the above-mentioned second transformation is performed on both of the first depth map of the calibration object subjected to the first transformation and the three-dimensional model data of the calibration object subjected to the first transformation to approximate to the opposite parties for alignment, and the second transformation to approximate to the opposite parties comprises sub-transformation of the two parties.

The first depth map of the calibration object subjected to the first transformation and the three-dimensional model data of the calibration object subjected to the first transformation, as described above, comprise the first depth map and the three-dimensional model data after the operations of performing the first transformation on the first depth map to be aligned to the three-dimensional model data, or performing the first transformation on the three-dimensional model data to be aligned to the first depth map, or performing the above-mentioned first transformation on both of the first depth map and the three-dimensional model data to approximate to the opposite parties, regardless of the approximating direction.

The second determining module is specifically configured to: determine the second matrix via a random sample consensus algorithm; or determine the third matrix via an iterative closest point algorithm by using the second matrix as an initial value.

Optionally, the second determining module is specifically configured to: determine a second matrix, which is used for first transformation on at least one of the first depth map of the calibration object and the three-dimensional model data of the calibration object, so that the first three-dimensional marking point and the second three-dimensional marking point are roughly aligned; and determine the first matrix, wherein the first matrix is obtained by performing second transformation with the second matrix as an initial value, and the second transformation is performed on at least one of the first depth map of the calibration object subjected to the first transformation and the three-dimensional model data of the calibration object subjected to the first transformation, so that the first three-dimensional marking point and the second three-dimensional marking point are accurately aligned. Optionally, the above-mentioned rough alignment may be that the first transformation is performed on the first depth map to be aligned to the three-dimensional model data, may also be that the first transformation is performed on the three-dimensional model data to be aligned to the first depth map, may also be that the above-mentioned first transformation is performed on both of the first depth map and the three-dimensional model data to approximate to the opposite parties for alignment, and the first transformation to approximate to the opposite parties comprises sub-transformation of the two parties. Optionally, the above-mentioned accurate alignment may be that the second transformation is performed on the first depth map of the calibration object subjected to the first transformation to be aligned to the three-dimensional model data of the calibration object subjected to the first transformation, may also be that the second transformation is performed on the three-dimensional model data of the calibration object subjected to the first transformation to be aligned to the first depth map of the calibration object subjected to the first transformation, and may also be that the above-mentioned first transformation is performed on both of the first depth map of the calibration object subjected to the first transformation and the three-dimensional model data of the calibration object subjected to the first transformation to approximate to the opposite parties for alignment, and the first transformation to approximate to the opposite parties comprises sub-transformation of the two parties.

The second determining module is specifically configured to: determine the second matrix via a random sample consensus algorithm; or determine the first matrix via an iterative closest point algorithm by using the second matrix as the initial value.

The device further comprises: a second obtaining module, configured to obtain a second two-dimensional image of the calibration object and a second depth map of the calibration object, wherein pixels in the second two-dimensional image correspond to pixels in the second depth map, and a second photographic device for photographing the second two-dimensional image and the second depth map is different from the first photographic device for photographing the first two-dimensional image and the first depth map; and a third determining module, configured to determine a third three-dimensional marking point in the second depth map corresponding to the marking point based on the marking point in the second two-dimensional image, and determine a fourth three-dimensional marking point in the three-dimensional model data of the calibration object corresponding to the marking point based on the marking point in the second two-dimensional image; determine a fourth matrix, which is used for transforming at least one of the second depth map of the calibration object and the three-dimensional model data of the calibration object, so that the third three-dimensional marking point and the fourth three-dimensional marking point are aligned; and determine a fifth matrix according to the first matrix and the fourth matrix, wherein the fifth matrix is used for representing a positional relation between the first photographic device and the second photographic device. Optionally, the first photographic device is a photographic device group composed of a photographic device for photographing the first two-dimensional image and a photographic device for photographing the first depth map, and the second photographic device is a photographic device group composed of a photographic device for photographing the second two-dimensional image and a photographic device for photographing the second depth map. Not only can the positional relation between the first photographic device and the second photographic device be obtained according to the first matrix and the fourth matrix, but also the relation among the coordinate system of the first photographic device, the coordinate system of the second photographic device and the coordinate system of the three-dimensional calibration photographic device can be known. For other detailed description about this paragraph, reference can be made to relevant introduction above.

Specifically, with respect to specific structures, functions, or other structures and functions of the device provided by the present embodiment, reference may be made to the description related to FIG. 2 and/or FIG. 3 in embodiment 1.

By adoption of the device for calibration provided by the present invention as described above, when the device for photographing the three-dimensional image is calibrated, it is simple and feasible, and the operation difficulty is small. As a plurality of cameras are used for scanning, the three-dimensional imaging effect of the head and the bottom is better than that if a moving camera is used for scanning, the calibration is easier, and smaller space is occupied than if the three-dimensional photographing and calibration method of using a plurality of cameras surrounding the photographed object.

Figure 7:
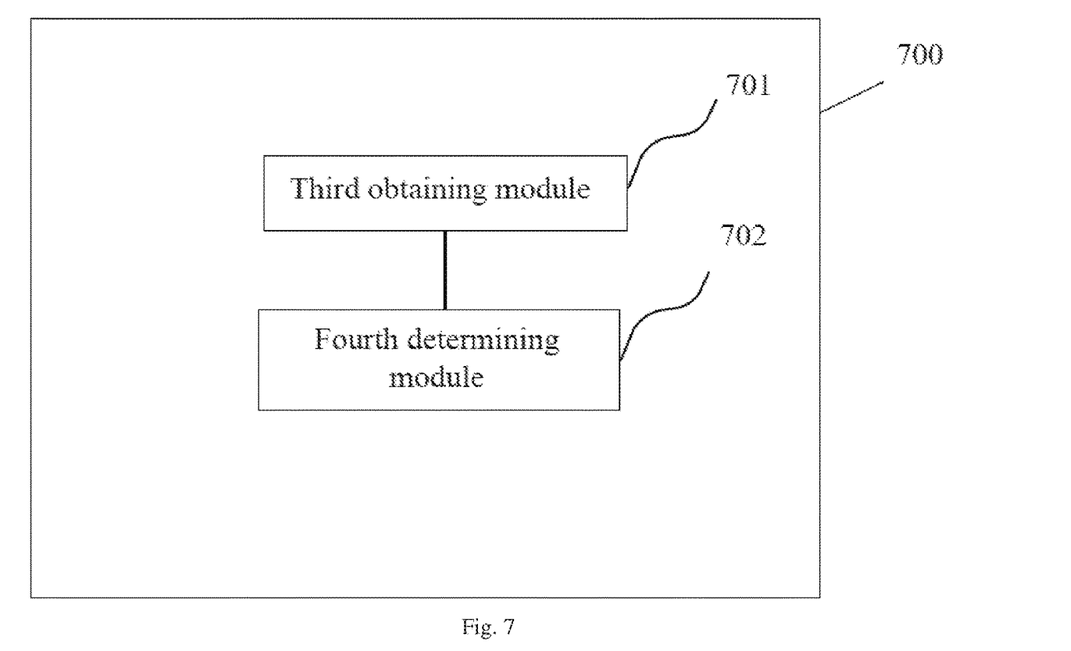
FIG. 7 is a structural schematic diagram of a device for calibration provided by embodiment 4 of the present invention.

A device 700 for calibration provided by embodiment 4 of the present invention is illustrated below in detail in combination with FIG. 7. As shown in FIG. 7, the device 700 comprises:

a third obtaining module 701, configured to obtain a first portion of a three-dimensional model of a calibration object, and a second portion of the three-dimensional model of the calibration object, wherein the first portion of the three-dimensional model of the calibration object is photographed by a third photographic device, the second portion of the three-dimensional model of the calibration object is photographed by a fourth photographic device, and a first portion of the calibration object corresponding to the first portion of the three-dimensional model and a second portion of the calibration object corresponding to the second portion of the three-dimensional model are overlapped on a third portion of the calibration object;

optionally, the first portion of the three-dimensional model may be a three-dimensional model of an upper half portion of the calibration object, and the second portion of the three-dimensional model may be a three-dimensional model of a middle portion of the calibration object, the three-dimensional model of the upper half portion and the three-dimensional model of the middle portion are partially overlapped, that is to say, the first portion of the calibration object corresponding to the three-dimensional model of the upper half portion and the second portion of the calibration object corresponding to the second portion of the three-dimensional model are overlapped on the third portion of the calibration object; and a fourth determining module 702, configured to determine a fifth matrix, which is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object.

Optionally, the first portion of the three-dimensional model of the calibration object may be transformed to be aligned to the second portion of the three-dimensional model of the calibration object, and the second portion of the three-dimensional model of the calibration object may also be transformed to be aligned to the first portion of the three-dimensional model of the calibration object.

Optionally, the fourth determining module is specifically configured to determine the fifth matrix via an iteration nearest point algorithm.

Optionally, the calibration object is a human body model, the first portion of the three-dimensional model of the calibration object is a three-dimensional model of an upper segment of the human body model, and the second portion of the three-dimensional model of the calibration object is a three-dimensional model of a middle segment of the human body model; and that the fifth matrix is used for transforming one of the first portion of the three-dimensional model of the calibration object and the second portion of the three-dimensional model of the calibration object, so that the first portion of the three-dimensional model and the second portion of the three-dimensional model are overlapped on the three-dimensional model corresponding to the third portion of the calibration object includes: the fifth matrix is used for transforming the three-dimensional model of the middle segment of the human body model, so that the three-dimensional model of the middle segment of the human body model and the three-dimensional model of the upper segment of the human body model are overlapped on the three-dimensional model corresponding to the third portion of the calibration object.

With respect to specific structures, functions, or other structures and functions of the device provided by the present embodiment, reference may be made to the description related to FIG. 5 in embodiment 2.

Compared with the calibration mode requiring the human body model in the prior art, the calibration device provided by the embodiment does not depend on the calibration object, thereby simplifying the calibration flow and the calibration method and reducing the calibration complexity.

Figure 8:
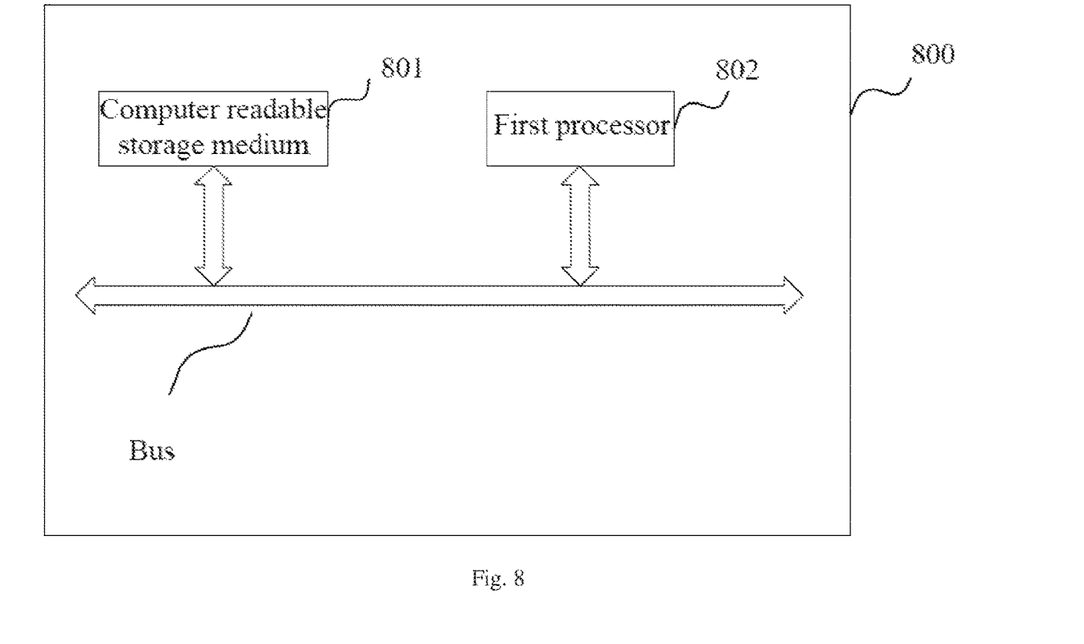
FIG. 8 is a structural schematic diagram of a device for calibration provided by embodiment 5 of the present invention.

A device 800 for image processing provided by embodiment 5 of the present invention will be specifically described below in combination with FIG. 8. The device comprises a computer readable storage medium 801, which stores a computer program, wherein the computer program, when executed by a first processor 802, implements the steps of the method as described in embodiment 1 or embodiment 2. As shown in FIG. 8, optionally, the device 800 may comprise a bus.

By adoption of the device for calibration provided by the embodiment of the present invention, when the device for photographing the three-dimensional image is calibrated, it is simple and feasible, and the operation difficulty is small. As a plurality of cameras are used for scanning, the three-dimensional imaging effect of the head and the bottom is better than that if a moving camera is used for scanning, the calibration is easier, and smaller space is occupied than if the three-dimensional photographing and calibration method of using a plurality of cameras surrounding the photographed object.

Figure 9:
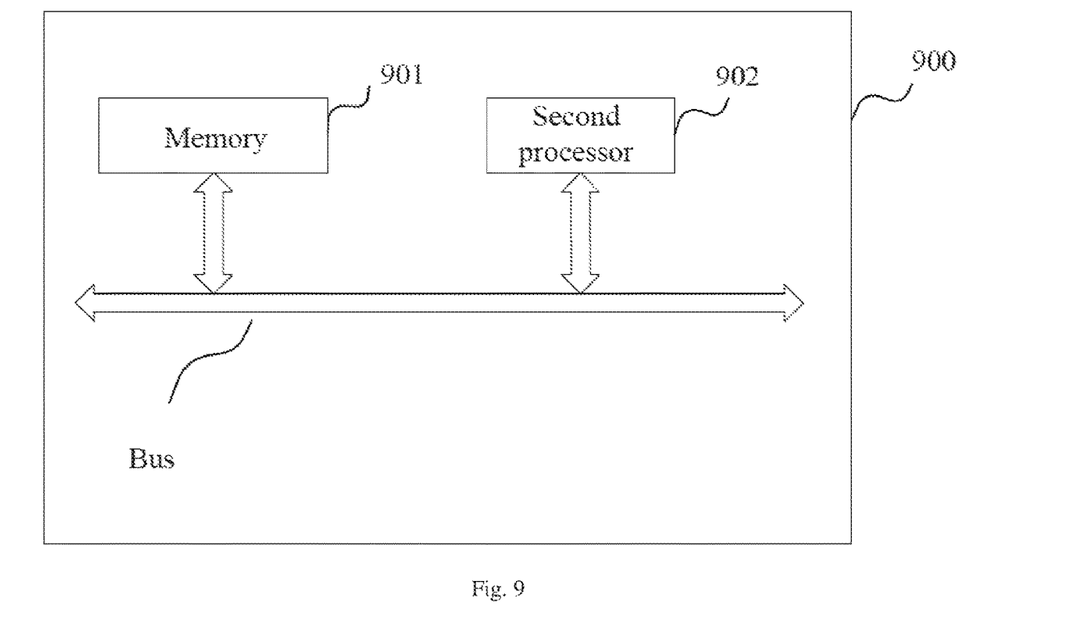
FIG. 9 is a structural schematic diagram of a device for calibration provided by embodiment 6 of the present invention.

A device 900 for calibration provided by embodiment 6 of the present invention will be specifically described below in combination with FIG. 9. The device comprises a memory 901, a second processor 902 and a computer program which is stored in the memory 901 and can be run on the second processor 902, wherein the computer program, when executed by the second processor 902, implements the steps of the method as described in embodiment 1 or embodiment 2. As shown in the figure, optionally, the device 900 may comprise a bus.

Compared with the calibration mode requiring the human body model in the prior art, the calibration method provided by the embodiment does not depend on the calibration object, thereby simplifying the calibration flow and the calibration method and reducing the calibration complexity.

Exemplarily, the computer program may be segmented into one or more modules/units, and the one or more modules/units are stored in the memory and executed by the processor to accomplish the present invention. The one or more modules/units may be a series of computer program instruction segments which can achieve specific functions, and the instruction segments are used for describing the execution process of the computer program in the device/terminal equipment.

The device/terminal equipment may be computing equipment such as a mobile phone, a tablet computer, a desktop computer, a notebook computer, a palm computer, a cloud server or the like. The device/terminal equipment may comprise, but not limited to, a processor or a memory. It could be understood by those skilled in the art that the schematic diagrams of the present invention are merely examples of the device/terminal equipment, instead of limiting the device/terminal equipment, which may comprise more or less components than in the diagrams, or combine some components or different components, e.g., the device/terminal equipment may further comprise input/output equipment, network access equipment, a bus, etc.

The foregoing processor may be a central processing unit (CPU), and may also be other general processor, a digital signal processor (DSP), an application specific integrated circuit (ASIC), a field-programmable gate array (FPGA) or other programmable logic device, a discrete gate or transistor logic device, a discrete hardware component, etc. The general processor may be a microprocessor or any conventional processor or the like, and the processor is a control center of the device/terminal equipment and connects all parts of the whole device/terminal equipment by using various interfaces and lines.

The memory may be configured to store the computer program and/or modules, and the processor achieves various functions of the device/terminal equipment by running or executing the computer program and/or modules stored in the memory and calling data stored in the memory. The memory may comprise a program storage area and a data storage area, wherein the program storage area may store an operating system, an application program required by at least one function (e.g., image playing function, etc.), etc.; and the data storage area may store data (e.g., video data, images, etc.) created according to the use of the mobile phone. Moreover, the memory may comprise a high-speed random access memory, and may also comprise a non-volatile memory such as a hard disk, a memory or a plug-in hard disk, a smart media card (SMC), a secure digital (SD) card, a flash card, at least one hard disk storage device, a flash device, or other non-volatile solid-state storage device.

When the modules/units integrated in the device/terminal equipment are implemented in the form of software functional units and sold or used as independent products, they may be stored in a computer readable storage medium. Based on such an understanding, all of or part of processes in the methods of the above-mentioned embodiments of the present invention may also be implemented with a computer program instructing corresponding hardware. The computer program may be stored in a computer readable storage medium. The computer program, when executed by the processor, can implement the steps of the method embodiments described above. The computer program comprises computer program codes, which may be in the form of source codes, object codes or executable files, or in some intermediate forms, etc. The computer readable medium may comprise any entity or device which can carry the computer program codes, a recording medium, a USB flash disk, a mobile hard disk, a magnetic disk, an optical disk, a computer memory, a read-only memory (ROM), a random access memory (RAM), an electric carrier signal, an electrical signal, a software distribution medium, etc.

Imaging of the target object in the embodiments described above may be partial imaging or integral imaging of the target object. Whichever of the partial imaging or the integral imaging, or a corresponding adjustment made to the partial imaging or the integral imaging is adopted is applicable to the method or device provided by the present invention. The foregoing adjustment made by those of ordinary skill in the art without any creative effort shall fall into the protection scope of the present invention.

What is claimed is:
1. A method for calibration, comprising:
obtaining a first two-dimensional image of a calibration object with a marking point and a first depth map of the calibration object;
obtaining calibrated three-dimensional model data of the calibration object, wherein pixels in the first two-dimensional image correspond to pixels in the first depth map;
determining a first three-dimensional marking point in the first depth map corresponding to the marking point based on the marking point in the first two-dimensional image;
determining a second three-dimensional marking point in the three-dimensional model data of the calibration object corresponding to the marking point based on the marking point in the first two-dimensional image; and
determining a first matrix, which is used for transforming at least one of the first depth map of the calibration object and the three-dimensional model data of the calibration object, so that the first three-dimensional marking point and the second three-dimensional marking point are aligned.

2. The method according to claim 1, wherein determining a first matrix comprises:
  determining a second matrix, which is used for first transformation on at least one of (1) the first depth map of the calibration object and (2) the three-dimensional model data of the calibration object, so that the first three-dimensional marking point and the second three-dimensional marking point are roughly aligned; and
  determining the first matrix, wherein the first matrix is obtained by performing second transformation with the second matrix as an initial value, and the second transformation is performed on at least one of (1) the first depth map of the calibration object subjected to the first transformation and (2) the three-dimensional model data of the calibration object subjected to the first transformation, so that the first three-dimensional marking point and the second three-dimensional marking point are accurately aligned.

3. The method according to claim 2, wherein:
  determining a second matrix comprises determining the second matrix via a random sample consensus algorithm; or
  determining a first matrix comprises determining the first matrix via an iterative closest point algorithm by using the second matrix as the initial value.

4. The method according to claim 1, wherein:
  the marking point has a color;
  determining a first three-dimensional marking point in the first depth map corresponding to the marking point based on the marking point in the first two-dimensional image comprises
    determining coordinates in the first two-dimensional image representing pixels of the marking point according to the color; and
    determining coordinates of the first three-dimensional marking point in the first depth map corresponding to the marking point according to a corresponding relation between the pixels in the first two-dimensional image and the pixels in the first depth map; and
  determining a second three-dimensional marking point in the three-dimensional model data of the calibration object corresponding to the marking point based on the marking point in the first two-dimensional image comprises:
    determining coordinates of the second three-dimensional marking point in the three-dimensional model data of the calibration object corresponding to the marking point according to (1) a positional relation between a first two-dimensional photographic device for photographing the first two-dimensional image and a three-dimensional calibration photographic device for photographing the three-dimensional model data of the calibration object, and (2) the coordinates of the pixels of the marking point in the first two-dimensional image.

5. A non-transitory computer readable storage medium, which stores a computer program, wherein the computer program, when executed by a processor, implements the steps of claim 1.

6. A device for image processing, comprising: a memory, a processor, and a computer program which is stored in the memory and can be run on the processor, wherein the computer program, when executed by the processor, implements the steps of the method of claim 1.

7. The method according to claim 1, wherein determining a first matrix comprises:
  determining a second matrix, which is used for a first transformation on at least one of (1) the first depth map of the calibration object and (2) the three-dimensional model data of the calibration object, so that the first three-dimensional marking point and the second three-dimensional marking point are roughly aligned;
  determining a third matrix, which is used for a second transformation on at least one of (1) the first depth map of the calibration object subjected to the first transformation and (2) the three-dimensional model data of the calibration object subjected to the first transformation, so that the first three-dimensional marking point and the second three-dimensional marking point are accurately aligned; and
  calculating the first matrix from the second matrix and the third matrix.

8. The method according to claim 7, wherein:
  determining a second matrix comprises determining the second matrix via a random sample consensus algorithm; or
  determining a third matrix comprises determining the third matrix via an iterative closest point algorithm by using the second matrix as an initial value.

9. The method according to claim 7, wherein the method further comprises:
  obtaining a second two-dimensional image of the calibration object and a second depth map of the calibration object, wherein pixels in the second two-dimensional image correspond to pixels in the second depth map, and a second photographic device for photographing the second two-dimensional image and the second depth map is different from a first photographic device for photographing the first two-dimensional image and the first depth map;
  determining a third three-dimensional marking point in the second depth map corresponding to the marking point based on the marking point in the second two-dimensional image;
  determining a fourth three-dimensional marking point in the three-dimensional model data of the calibration object corresponding to the marking point based on the marking point in the second two-dimensional image;
  determining a fourth matrix, which is used for transforming at least one of (1) the second depth map of the calibration object and (2) the three-dimensional model data of the calibration object, so that the third three-dimensional marking point and the fourth three-dimensional marking point are aligned; and
  determining a fifth matrix according to the first matrix and the fourth matrix, wherein the fifth matrix represents a positional relation between the first photographic device and the second photographic device.

10. A method for calibration, comprising:
  obtaining a first portion of a three-dimensional model of a calibration object;
  obtaining a second portion of the three-dimensional model of the calibration object, wherein the first portion of the three-dimensional model of the calibration object is photographed by a first photographic device, the second portion of the three-dimensional model of the calibration object is photographed by a second photographic device, and a first part of the calibration object corresponding to the first portion of the three-dimensional model and a second part of the calibration object corresponding to the second portion of the three-dimensional model overlap in a third part of the calibration object; and determining a matrix, which is used for transforming one of (1) the first portion of the three-dimensional model of the calibration object and (2) the second portion of the three-dimensional model of the calibration object, so that the first portion of the three-dimensional model and the second portion of the three-dimensional model overlap in the three-dimensional model corresponding to the third part of the calibration object.

11. The method according to claim 10, wherein determining a matrix comprises determining the matrix via an iteration nearest point algorithm.

12. The method according to claim 10, wherein:
the calibration object is a human body model, the first portion of the three-dimensional model of the calibration object is a three-dimensional model of an upper segment of the human body model, and the second portion of the three-dimensional model of the calibration object is a three-dimensional model of a middle segment of the human body model; and
the matrix is used for transforming the three-dimensional model of the middle segment of the human body model, so that the three-dimensional model of the middle segment of the human body model and the three-dimensional model of the upper segment of the human body model overlap in the three-dimensional model corresponding to the third part of the calibration object.

13. A device for calibration, comprising:
a first obtaining module, configured to obtain:
a first two-dimensional image of a calibration object with a marking point and a first depth map of the calibration object; and
calibrated three-dimensional model data of the calibration object, wherein pixels in the first two-dimensional image correspond to pixels in the first depth map;
a first determining module, configured to determine:
a first three-dimensional marking point in the first depth map corresponding to the marking point based on the marking point in the first two-dimensional image;
a second three-dimensional marking point in the three-dimensional model data of the calibration object corresponding to the marking point based on the marking point in the first two-dimensional image; and
a second determining module, configured to determine a first matrix, which is used for transforming at least one of the first depth map of the calibration object and the three-dimensional model data of the calibration object, so that the first three-dimensional marking point and the second three-dimensional marking point are aligned.

14. The device according to claim 13, wherein the second determining module is configured to:
determine a second matrix, which is used for first transformation on at least one of (1) the first depth map of the calibration object and (2) the three-dimensional model data of the calibration object, so that the first three-dimensional marking point and the second three-dimensional marking point are roughly aligned; and
determine a third matrix, which is used for second transformation on at least one of (1) the first depth map of the calibration object subjected to the first transformation and (2) the three-dimensional model data of the calibration object subjected to the first transformation, so that the first three-dimensional marking point and the second three-dimensional marking point are accurately aligned; and calculate the first matrix from the second matrix and the third matrix.

15. The device according to claim 14, wherein the second determining module is configured to:
determine the second matrix via a random sample consensus algorithm; or
determine the third matrix via an iterative closest point algorithm by using the second matrix as an initial value.

16. The device according to claim 14, wherein the device further comprises:
a second obtaining module, configured to obtain a second two-dimensional image of the calibration object and a second depth map of the calibration object, wherein pixels in the second two-dimensional image correspond to pixels in the second depth map, and a second photographic device for photographing the second two-dimensional image and the second depth map is different from a first photographic device for photographing the first two-dimensional image and the first depth map; and
a third determining module, configured to:
determine a third three-dimensional marking point in the second depth map corresponding to the marking point based on the marking point in the second two-dimensional image;
determine a fourth three-dimensional marking point in the three-dimensional model data of the calibration object corresponding to the marking point based on the marking point in the second two-dimensional image;
determine a fourth matrix, which is used for transforming at least one of (1) the second depth map of the calibration object and (2) the three-dimensional model data of the calibration object, so that the third three-dimensional marking point and the fourth three-dimensional marking point are aligned; and
determine a fifth matrix according to the first matrix and the fourth matrix, wherein the fifth matrix represents a positional relation between the first photographic device and the second photographic device.

17. The device according to claim 13, wherein the second determining module is configured to:
determine a second matrix, which is used for first transformation on at least one of (1) the first depth map of the calibration object and (2) the three-dimensional model data of the calibration object, so that the first three-dimensional marking point and the second three-dimensional marking point are roughly aligned; and
determine the first matrix, wherein the first matrix is obtained by performing second transformation with the second matrix as an initial value, and the second transformation is performed on at least one of (1) the first depth map of the calibration object subjected to the first transformation and (2) the three-dimensional model data of the calibration object subjected to the first transformation, so that the first three-dimensional marking point and the second three-dimensional marking point are accurately aligned.

18. The device according to claim 17, wherein the second determining module is configured to:
determine the second matrix via a random sample consensus algorithm; or
determine the first matrix via an iterative closest point algorithm by using the second matrix as the initial value.

19. The device according to claim 13, wherein:
the marking point has a color; and the first determining module is configured to:
- determine coordinates in the first two-dimensional image representing pixels of the marking point according to the color;
- determine coordinates of the first three-dimensional marking point in the first depth map corresponding to the marking point according to a corresponding relation between the pixels in the first two-dimensional image and the pixels in the first depth map; and
- determine coordinates of the second three-dimensional marking point in the three-dimensional model data of the calibration object corresponding to the marking point according to (1) a positional relation between a first two-dimensional photographic device for photographing the first two-dimensional image and a three-dimensional calibration photographic device for photographing the three-dimensional model data of the calibration object, and (2) the coordinates of the pixels of the marking point in the first two-dimensional image.

20. A device for calibration, comprising:
a first obtaining module, configured to obtain:
- a first portion of a three-dimensional model of a calibration object; and
- a second portion of the three-dimensional model of the calibration object, wherein the first portion of the three-dimensional model of the calibration object is photographed by a first photographic device, the second portion of the three-dimensional model of the calibration object is photographed by a second photographic device, and a first part of the calibration object corresponding to the first portion of the three-dimensional model and a second part of the calibration object corresponding to the second portion of the three-dimensional model overlap in a third part of the calibration object; and a second determining module, configured to determine a matrix, which is used for transforming one of (1) the first portion of the three-dimensional model of the calibration object and (2) the second portion of the three-dimensional model of the calibration object, so that the first portion of the three-dimensional model and the second portion of the three-dimensional model overlap in the three-dimensional model corresponding to the third part of the calibration object.

21. The device according to claim 20, wherein the fourth determining module is configured to determine the matrix via an iteration nearest point algorithm.

22. The device according to claim 20, wherein:
the calibration object is a human body model, the first portion of the three-dimensional model of the calibration object is a three-dimensional model of an upper segment of the human body model, and the second portion of the three-dimensional model of the calibration object is a three-dimensional model of a middle segment of the human body model; and
the matrix is used for transforming the three-dimensional model of the middle segment of the human body model, so that the three-dimensional model of the middle segment of the human body model and the three-dimensional model of the upper segment of the human body model overlap in the three-dimensional model corresponding to the third part of the calibration object.

* * * * *